US008374088B2

(12) United States Patent  (10) Patent No.: US 8,374,088 B2
Balay et al.                 (45) Date of Patent: Feb. 12, 2013

(54) MANAGING HIERARCHICALLY ORGANIZED SUBSCRIBER PROFILES

(75) Inventors: Rajesh I. Balay, San Jose, CA (US); Chandramouli Sargor, Sunnyvale, CA (US); Sachin S. Desai, Santa Clara, CA (US); Francois Lemarchand, Palaiseau (FR); Amit K. Khetawat, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 13/359,960

(22) Filed: Jan. 27, 2012

(65) Prior Publication Data
US 2012/0131215 A1    May 24, 2012

Related U.S. Application Data

(60) Continuation of application No. 13/158,681, filed on Jun. 13, 2011, now Pat. No. 8,107,376, which is a division of application No. 12/202,223, filed on Aug. 30, 2008, now Pat. No. 7,961,615, which is a division of application No. 10/991,970, filed on Nov. 18, 2004, now Pat. No. 7,808,904.

(51) Int. Cl.
*G01R 31/08*   (2006.01)
*H04J 1/16*    (2006.01)
*G06F 15/173*  (2006.01)

(52) U.S. Cl. ............ 370/233; 370/234; 370/395.21; 370/395.3; 370/395.41; 370/395.43; 370/395.53; 370/409; 709/225

(58) Field of Classification Search ......... 370/254–258, 370/223–226, 230–235, 397–395.3, 395.4–395.43, 370/395.53, 409; 709/223–226
See application file for complete search history.

(56) References Cited

U.S. PATENT DOCUMENTS

| | | | |
|---|---|---|---|
| 4,667,323 A | 5/1987 | Engdahl et al. | |
| 4,726,018 A | 2/1988 | Bux et al. | |
| 5,483,525 A | 1/1996 | Song et al. | |
| 5,491,691 A | 2/1996 | Shtayer et al. | |
| 5,598,414 A | 1/1997 | Walser et al. | |
| 5,875,290 A | 2/1999 | Bartfal et al. | |
| 6,014,382 A | 1/2000 | Takihiro et al. | |
| 6,094,674 A | 7/2000 | Hattori et al. | |
| 6,192,051 B1* | 2/2001 | Lipman et al. | 370/389 |
| 6,212,556 B1 | 4/2001 | Arunachalam | |
| 6,324,583 B1 | 11/2001 | Stevens | |
| 6,339,782 B1 | 1/2002 | Gerard et al. | |
| 6,343,083 B1 | 1/2002 | Mendelson et al. | |
| 6,424,657 B1 | 7/2002 | Voit et al. | |
| 6,449,650 B1 | 9/2002 | Westfall et al. | |
| 6,487,666 B1 | 11/2002 | Shanklin | |
| 6,493,349 B1 | 12/2002 | Casey | |

(Continued)

OTHER PUBLICATIONS

Non-Final Rejection for U.S. Appl. No. 12/637,140, mailed Sep. 17, 2010.

(Continued)

*Primary Examiner* — Phirin Sam
*Assistant Examiner* — Mounir Moutaouakil
(74) *Attorney, Agent, or Firm* — Hamilton, DeSanctis & Cha LLP

(57) ABSTRACT

Methods are provided for managing hierarchically organized subscriber profiles. According to one embodiment, a connection for a subscriber is created based on a service context of the subscriber. A connection request is received from a subscriber of a network service delivery environment. The subscriber is associated with a first-level profile identifier indicative of a service context for the subscriber. One or more other subscribers can be associated with the first-level profile identifier. Lower-level profile identifiers are determined using the first-level profile identifier. The lower-level profile identifiers indicate a set of services that is available to the subscriber during the connection. Creating a connection for the subscriber that enables forwarding of packets based on the lower-level profile identifiers.

20 Claims, 9 Drawing Sheets

U.S. PATENT DOCUMENTS

| | | | |
|---|---|---|---|
| 6,542,515 B1* | 4/2003 | Kumar et al. | 370/463 |
| 6,611,498 B1* | 8/2003 | Baker et al. | 370/252 |
| 6,625,650 B2 | 9/2003 | Stelliga | |
| 6,701,449 B1 | 3/2004 | Davis et al. | |
| 6,763,236 B2* | 7/2004 | Siren | 455/450 |
| 6,785,691 B1 | 8/2004 | Hewett et al. | |
| 6,807,181 B1* | 10/2004 | Weschler | 370/400 |
| 6,816,462 B1 | 11/2004 | Booth et al. | |
| 6,894,994 B1* | 5/2005 | Grob et al. | 370/335 |
| 6,920,580 B1 | 7/2005 | Cramer et al. | |
| 6,980,526 B2 | 12/2005 | Jang et al. | |
| 7,054,291 B2 | 5/2006 | Balazinski et al. | |
| 7,127,049 B2 | 10/2006 | Godse et al. | |
| 7,149,216 B1 | 12/2006 | Cheriton | |
| 7,221,945 B2* | 5/2007 | Milford et al. | 455/452.1 |
| 7,243,371 B1 | 7/2007 | Kasper et al. | |
| 7,293,255 B2 | 11/2007 | Kumar | |
| 7,316,029 B1* | 1/2008 | Parker et al. | 726/13 |
| 7,324,489 B1* | 1/2008 | Iyer | 370/338 |
| 7,720,053 B2 | 5/2010 | Hussain | |
| 7,761,743 B2 | 7/2010 | Talaugon | |
| 7,808,904 B2 | 10/2010 | Balay | |
| 7,830,787 B1 | 11/2010 | Wijnands et al. | |
| 7,843,813 B2 | 11/2010 | Balay | |
| 7,869,361 B2 | 1/2011 | Balay | |
| 7,876,683 B2 | 1/2011 | Balay | |
| 7,881,244 B2 | 2/2011 | Balay | |
| 7,925,920 B2 | 4/2011 | Talaugon | |
| 7,933,269 B2 | 4/2011 | Cheng | |
| 7,957,407 B2 | 6/2011 | Desai | |
| 7,961,615 B2 | 6/2011 | Balay | |
| 8,107,376 B2 | 1/2012 | Balay | |
| 8,306,040 B2 | 11/2012 | Desai et al. | |
| 8,320,279 B2 | 11/2012 | Sarkar et al. | |
| 2001/0024425 A1* | 9/2001 | Tsunoda et al. | 370/282 |
| 2001/0028636 A1* | 10/2001 | Skog et al. | 370/328 |
| 2001/0043571 A1 | 11/2001 | Jang et al. | |
| 2002/0023171 A1 | 2/2002 | Garrett et al. | |
| 2002/0071389 A1* | 6/2002 | Seo | 370/232 |
| 2002/0150093 A1* | 10/2002 | Ott et al. | 370/389 |
| 2003/0012209 A1* | 1/2003 | Abdelilah et al. | 370/412 |
| 2003/0026262 A1 | 2/2003 | Jarl | |
| 2003/0063590 A1* | 4/2003 | Mohan et al. | 370/338 |
| 2004/0095932 A1* | 5/2004 | Astarabadi et al. | 370/389 |
| 2005/0055306 A1 | 3/2005 | Miller et al. | |
| 2005/0083955 A1 | 4/2005 | Guichard et al. | |
| 2005/0113114 A1 | 5/2005 | Asthana | |
| 2005/0213589 A1* | 9/2005 | Shih | 370/398 |
| 2005/0243798 A1 | 11/2005 | Dunn et al. | |
| 2009/0131020 A1 | 5/2009 | van de Groenendaal | |
| 2009/0279567 A1 | 11/2009 | Ta et al. | |
| 2010/0142527 A1 | 6/2010 | Balay et al. | |
| 2010/0146098 A1 | 6/2010 | Ishizakl et al. | |
| 2010/0146627 A1 | 6/2010 | Lin | |
| 2010/0189016 A1 | 7/2010 | Millet | |
| 2010/0220732 A1 | 9/2010 | Hussain et al. | |
| 2010/0220741 A1 | 9/2010 | Desai et al. | |
| 2011/0122872 A1 | 5/2011 | Balay | |

OTHER PUBLICATIONS

Non-Final Rejection for U.S. Appl. No. 12/537,898, mailed Sep. 9, 2010.

Final Rejection for U.S. Appl. No. 12/202,223, mailed Sep. 16, 2010.

Non-Final Rejection for U.S. Appl. No. 12/202,233 mailed Jun. 21, 2010.

Non-Final Rejection for U.S. Appl. No. 11/460,977, mailed Jul. 2, 2010.

Non-Final Rejection for U.S. Appl. No. 12/477,124 mailed May 23, 2011.

Non-Final Rejection for U.S. Appl. No. 12/762,362 mailed Feb. 2, 2012.

Non-Final Rejection for U.S. Appl. No. 12/906,999 mailed Nov. 21, 2012.

Non-Final Rejection for U.S. Appl. No. 13/050,387 mailed Nov. 13, 2012.

Notice of Allowance for U.S. Appl. No. 13/022,696 mailed Oct. 12, 2012.

Non-Final Rejection for U.S. Appl. No. 10/991,970 mailed Oct. 24, 2008.

Non-Final Rejection for U.S. Appl. No. 10/991,970 mailed May 18, 2009.

Non-Final Rejection for U.S. Appl. No. 10/991,970 mailed Jan. 12, 2010.

Notice of Allowance for U.S. Appl. No. 10/991,970 mailed Aug. 23, 2010.

Non-Final Rejection for U.S. Appl. No. 12/202,223 mailed Mar. 3, 2010.

Notice of Allowance for U.S. Appl. No. 12/202,223 mailed May 2, 2011.

Notice of Allowance for U.S. Appl. No. 13/158,681 mailed Sep. 29, 2011.

Non-Final Rejection for U.S. Appl. No. 12/202,224 mailed Apr. 16, 2010.

Notice of Allowance for U.S. Appl. No. 12/202,224 mailed Oct. 21, 2010.

Non-Final Rejection for U.S. Appl. No. 12/202,224 mailed Mar. 23, 2010.

Notice of Allowance for U.S. Appl. No. 12/202,224 mailed Dec. 1, 2010.

Notice of Allowance for U.S. Appl. No. 12/202,233 mailed Dec. 16, 2010.

* cited by examiner

700

| LEVEL-ONE IDENTIFIERS | LEVEL-TWO PROFILE IDENTIFIERS |
|---|---|
| S1 | F1,F2,F3 |
| S2 | F1,F3 |
| S3 | F3, F4 |
| S4 | F5 |
| S5 | F2, F5 |

704

| LEVEL-TWO IDENTIFIERS | LEVEL-THREE PROFILE IDENTIFIERS |
|---|---|
| F1 | A1 |
| F2 | A2 |
| F3 | A1, A3 |
| F4 | A4, A3, A6 |
| F5 | A5 |

MANAGING HIERARCHICALLY ORGANIZED SUBSCRIBER PROFILES

CROSS-REFERENCE TO RELATED APPLICATIONS

This application is a continuation of U.S. patent application Ser. No. 13/158,681, filed Jun. 13, 2011, now U.S. Pat. No. 8,107,376, which is a divisional of U.S. patent application Ser. No. 12/202,223, filed Aug. 30, 2008, now U.S. Pat. No. 7,961,615, which is a divisional of U.S. patent application Ser. No. 10/991,970, filed Nov. 18, 2004, now U.S. Pat. No. 7,808,904, each of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2004-2012, Fortinet, Inc.

FIELD

Various embodiments of the present invention are related to the field of telecommunications and more particularly to delivering network services based on hierarchically organized subscriber profiles.

BACKGROUND

In a networking service delivery environment (e.g., a digital subscriber line service environment), it is critical to deploy fast, versatile, and scalable systems. Broadband service providers (e.g., DSL) typically offer a large variety of service plans, which allow subscribers to choose between various service options. For example, subscribers can choose between low-cost service plans offering basic services and expensive service plans offering premium services.

For DSL providers, as the number of subscribers and services increases, so does the amount of system resources needed for tracking subscriber services. According to one prior art technique, a DSL provider stores a list of services for each subscriber. Such a list can include the subscriber's maximum bandwidth, available filters (e.g., firewalls), encryption information, virtual private network information, access control lists, etc. When a subscriber initiates a session, the service provider retrieves the subscriber's service list to determine which services are available to the subscriber. As the number of subscribers grows, repeated fetching of service lists can create computational and communication overhead. Moreover, with a large number of subscribers, the space needed for storing service lists can become relatively large. Furthermore, when the DSL provider adds new services, it must update each subscriber's service list, consuming system resources and potentially reducing the system's service capacity.

SUMMARY

Methods and apparatus for managing hierarchically organized subscriber profiles are described. According to one embodiment, a method is provided for creating a connection for a subscriber based on a service context of the subscriber. A connection request is received from a subscriber of a network service delivery environment. The subscriber is associated with a first-level profile identifier indicative of a service context for the subscriber. One or more other subscribers can be associated with the first-level profile identifier. Lower-level profile identifiers are determined using the first-level profile identifier. The lower-level profile identifiers indicate a set of services that is available to the subscriber during the connection. A connection is created for the subscriber that enables forwarding of packets based on the lower-level profile identifiers.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 7 illustrates tables stored in the policy engine, according to exemplary embodiments of the invention;

DETAILED DESCRIPTION

Methods and apparatus for managing subscriber profiles are described herein. In the following description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams will be described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Moreover, it should be understood that although the flow diagrams may depict serial operations, certain embodiments could perform certain of those operations in parallel.

This description of various embodiments of the present invention is divided into three sections. The first section presents an overview of exemplary embodiments of the invention. The second section presents an exemplary system architecture, while the third section describes exemplary operations performed by embodiments of the system.

Overview

This section presents an overview of a telecommunications system for managing service profile information for a large number of subscribers.

Figure 1:
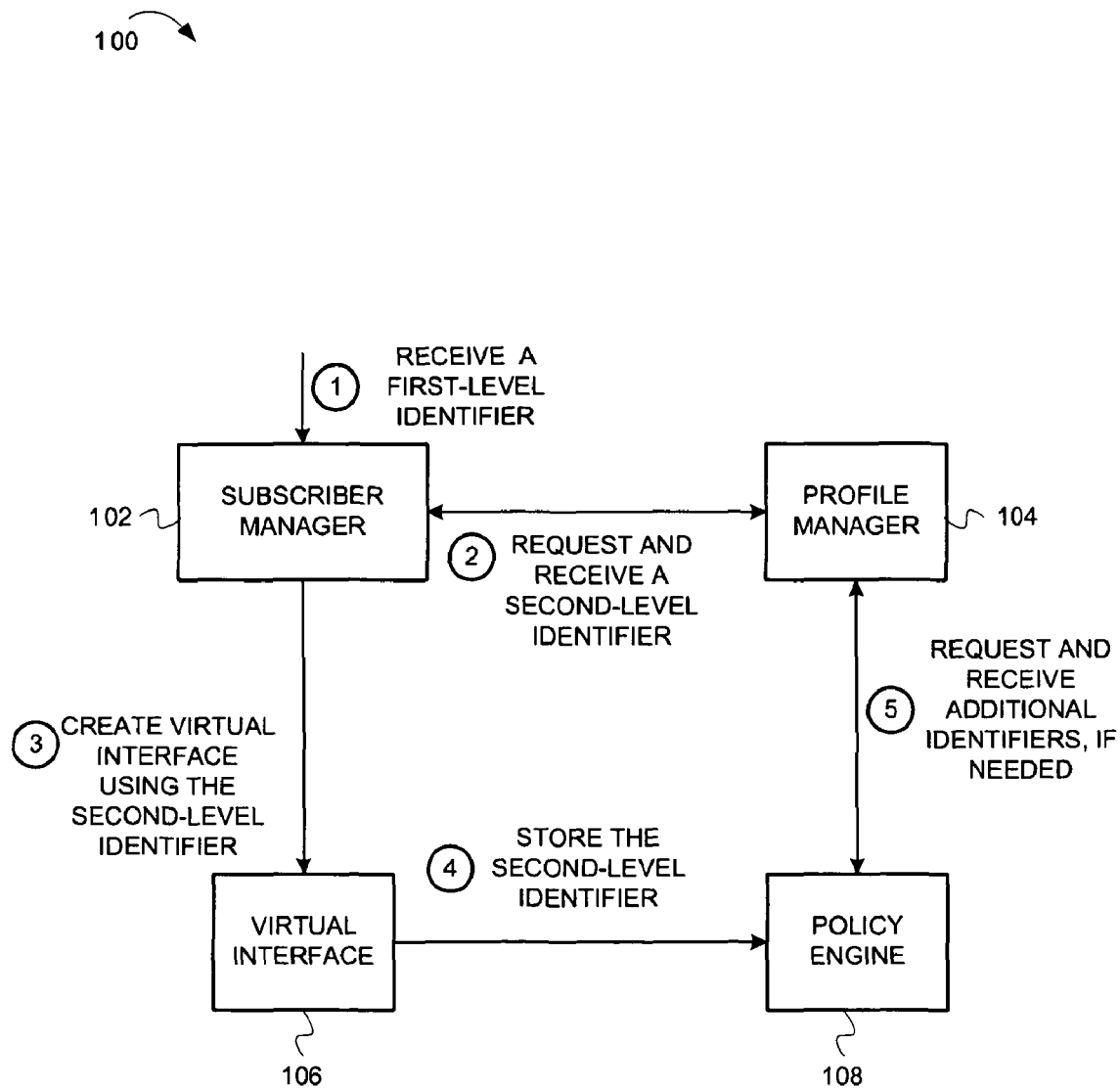
FIG. 1 is a dataflow diagram illustrating dataflow occurring in conjunction with configuring a subscriber connection, according to exemplary embodiments of the invention.

FIG. 1 is a dataflow diagram illustrating dataflow occurring in conjunction with configuring a subscriber connection, according to exemplary embodiments of the invention. In FIG. 1, a telecommunications system 100 includes a subscriber manager 102, profile manager 104, virtual interface 106, and policy engine 108. The exemplary system 100 is adapted to provide network services to thousands of subscribers. Each subscriber can receive a set of services upon establishing a connection with the system 100. The services can include firewalls, various qualities of service, tunneling support, virtual private network support, etc. Although there are numerous services and thousands of subscribers, the number of different service combinations is relatively small. That is, each of the thousands of users subscribers use one or more of a relatively small number (e.g., 30) of service contexts, where a service context refers to a combination of services that a subscriber receives during a connection. Therefore, each subscriber is associated with one or more service contexts.

Each service context can include one or more profile identifiers. For example, a service context can include profile identifiers that define the following services: bandwidth=100 kbps, firewall=high security firewall, VPN support=not enabled, and tunneling support=not enabled. The profile identifiers can be organized in a hierarchy. For example, a first-level profile identifier can define a service or refer to one or more second-level profile identifiers. The second-level profile identifiers can either define services or refer to third-level profile identifiers, and so on.

The dataflow of FIG. 1 describes determining services represented by a hierarchy of profile identifiers. The dataflow is divided into five stages. At stage one, when establishing a subscriber connection, the subscriber manager 102 receives a first-level profile identifier associated with the subscriber. At stage two, the subscriber manager 102 requests and receives second-level profile information including a second-level profile identifier (associated with the first-level profile identifier) from the profile manager 104.

At stage three, the subscriber manager 102 creates a virtual interface 106 and configures the virtual interface 106 according to the second-level profile information. In one embodiment, the virtual interface 106 defines a physical connection to a subscriber. In one embodiment, the second-level profile information defines inbound and outbound policies used when forwarding packets through the virtual interface 106.

At stage four, the second-level profile information is stored in the policy engine 108. At stage five, the policy engine requests and receives additional lower-level profile information including lower-level profile identifiers for defining services used in configuring the virtual interface 106. After the policy engine 108 stores the profile information, the system 100 can use the profile identifiers to define services on other later-created virtual interfaces that use the same profile identifiers.

Arranging profile identifiers in a hierarchy allows the system 100 to provide services at a high level of granularity. More specifically, because a first-level profile identifier can refer to several lower-level profile identifiers that define a service, the services can be very specifically defined. For example, "Premium" Internet service, represented by a first-level profile identifier, can be defined as 1 Mbps bandwidth, a premium firewall, and virus protection. The premium firewall can be further defined using additional lower-level profile identifiers. Having highly granular services allows the system to offer a broad range of customizable services.

Organizing the profile identifiers in a hierarchy also allows the system 100 to modify services without updating each subscriber's profile identifiers. In one embodiment, the system 100 stores a high-level profile identifier for each subscriber. If a service is modified, the system 100 does not modify each subscriber's high-level profile identifiers. In contrast, in one embodiment, the system 100 may implement a service change by modifying a common database of lower-level profile identifiers.

Exemplary System Operating Environment

This section describes an exemplary operating environment and system architecture, according to embodiments of the invention. Operations performed by the exemplary system are described in the next section. In this section, FIGS. 2 and 3 are presented.

Figure 2:
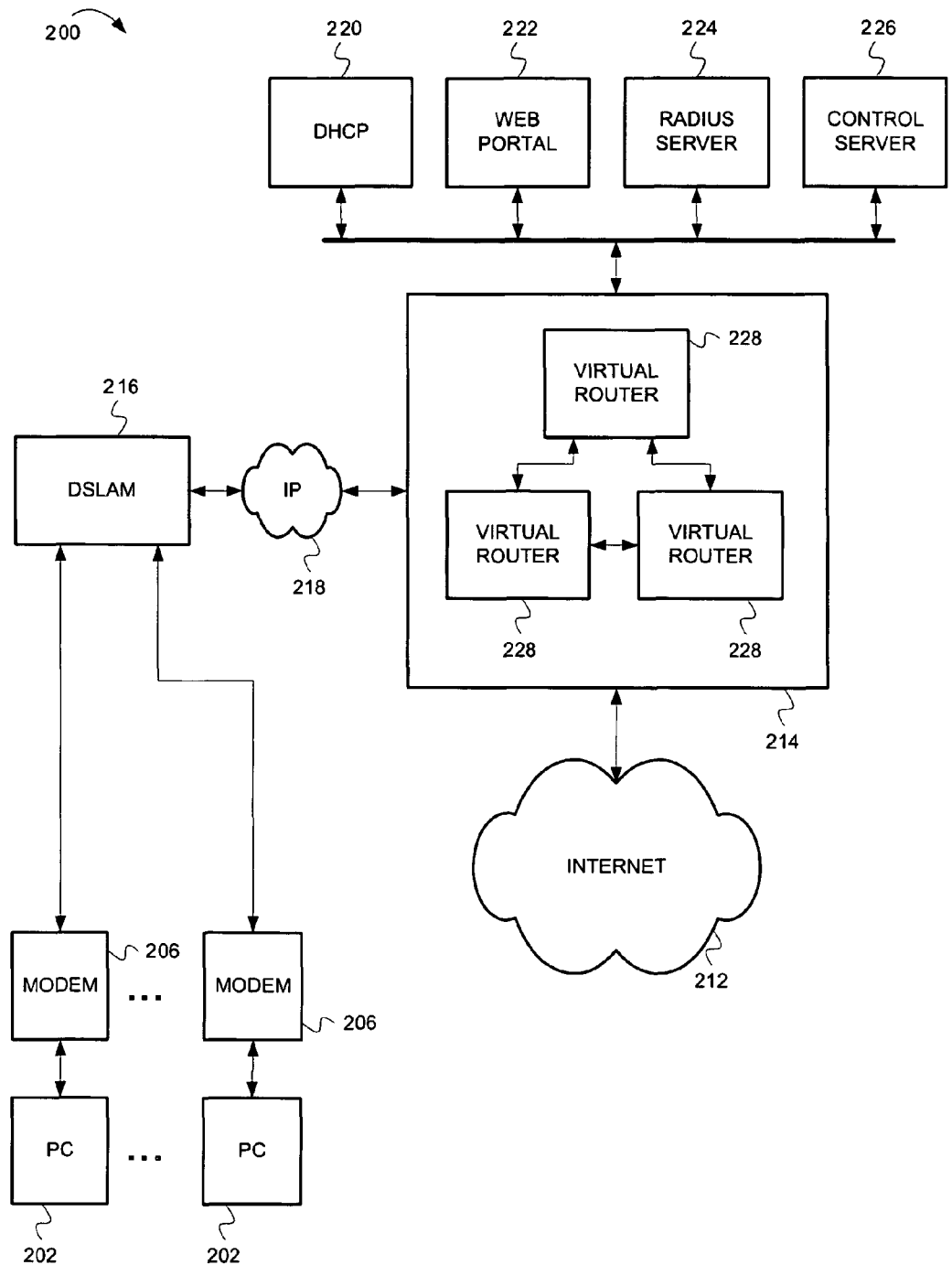
FIG. 2 is a block diagram illustrating an operating environment for certain embodiments of the invention.
Figure 3:
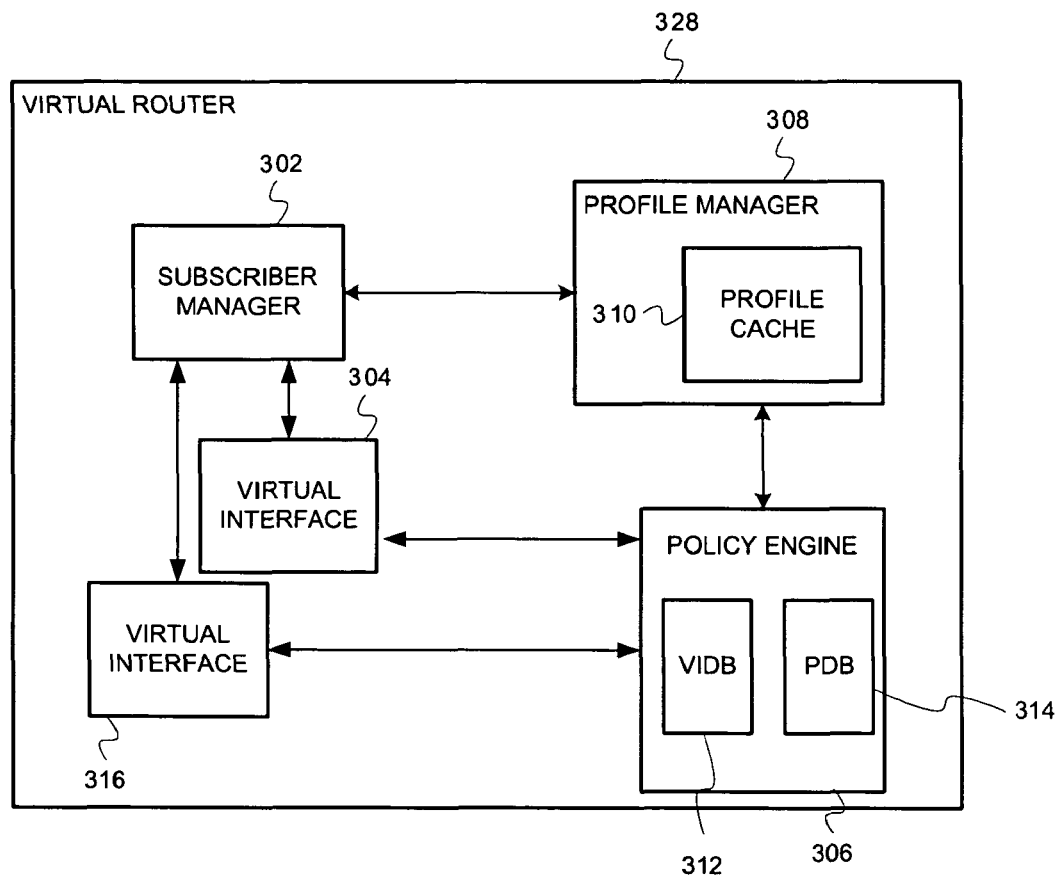
FIG. 3 is a block diagram illustrating a virtual router, according to exemplary embodiments of the invention.

FIG. 2 is a block diagram illustrating an operating environment for certain embodiments of the invention. As shown in FIG. 2, personal computers (PCs) 202 are connected to modems 206. The modems 206 are connected to a digital subscriber line access module (DSLAM) 216, which multiplexes signals from the modems 206 onto the Internet protocol (IP) network 218. The IP network 218 is connected to a router box 214 that includes virtual routers (VRs) 228. The router box 214 is connected to the Internet 212. The router box 214 is also connected to a dynamic host configuration protocol (DHCP) server 220, web portal 222, RADIUS server 224, and control server 226.

Although the router 214 includes three VRs, other embodiments call for any number of VRs or any computing system. In one embodiment, one or more of the VRs 228 can establish subscriber connections. When establishing the connections, the VRs 228 can use the DHCP server 220 for assigning IP addresses to the PCs 202. The VRs 228 can use the RADIUS server 224 to authenticate subscribers. After authenticating subscribers, the VRs 228 can configure subscriber connections according to service contexts, which refer to services that subscribers receive during connections. In one embodiment, the VRs 228 can receive service profile information from the control server 226 and/or the RADIUS server 224.

After the VRs 228 establish subscriber connections, they provide access to the web portal 222, where users can select new services. Additionally, after establishing subscriber connections, the VRs 228 process and forward packets over the IP network 218 and the Internet 212.

While FIG. 2 describes an exemplary operating environment, FIG. 3 describes a virtual router in more detail. FIG. 3 is a block diagram illustrating a virtual router, according to exemplary embodiments of the invention. As shown in FIG. 3, virtual router 328 includes a subscriber manager 302 connected to virtual interfaces 304 and 316. The virtual interfaces 304 are connected to a policy engine 306, which is connected to a profile manager 308. The profile manager 308 is connected to the subscriber manager 302. The profile manager 308 includes a profile cache 310 and the policy engine 306 includes a virtual interface database 312 and a profile database 310.

In one embodiment, the subscriber manager 302 processes subscriber connection requests, while the profile manager 308 stores subscriber profile information used for establishing subscriber connections and processing subscriber data. In one embodiment, the policy engine 306 aids in de-referencing subscriber profiles. In one embodiment, the profile database 314 stores profile identifiers that define subscriber services, whereas the virtual interface database 312 can store first-level profile identifiers and/or services used for defining services associated with the virtual interfaces (VIs) 304. Operations of the virtual router's functional units are described below in the next section.

It should be understood that the functional units (e.g., the subscriber manager 302, virtual interface 304, etc.) of the virtual router 328 can be integrated or divided, forming any number of functional units. Moreover, the functional units can be communicatively coupled using any suitable communication method (e.g., message passing, parameter passing, and/or signals through one or more communication paths etc.). Additionally, the functional units can be physically connected according to any suitable interconnection architecture (e.g., fully connected, hypercube, etc.).

According to embodiments of the invention, the functional units can be any suitable type of logic (e.g., digital logic) for executing the operations described herein. Any of the functional units used in conjunction with embodiments of the invention can include machine-readable media including instructions for performing operations described herein. Machine-readable media include any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.), etc.
Exemplary Operations This section describes exemplary operations of the exemplary system described above. In the following discussion, FIG. 4 describes operations performed by an embodiment of a subscriber manager. FIG. 5 describes operations performed by an embodiment of a profile manager and FIG. 6 describes operations performed by an embodiment of a policy engine.

Figure 4:
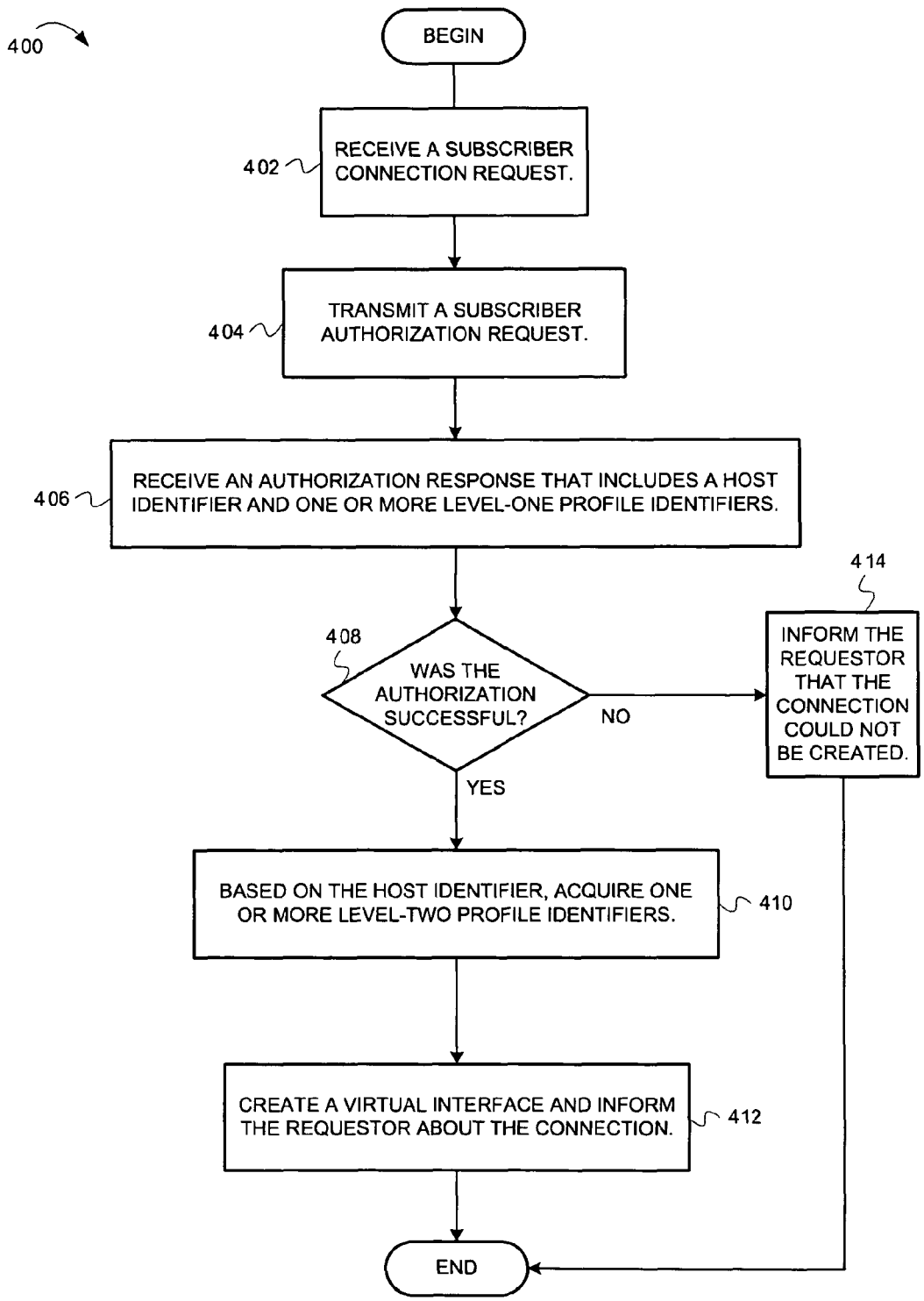
FIG. 4 is a flow diagram illustrating operations for creating a subscriber connection, according to exemplary embodiments of the invention.
Figure 5:
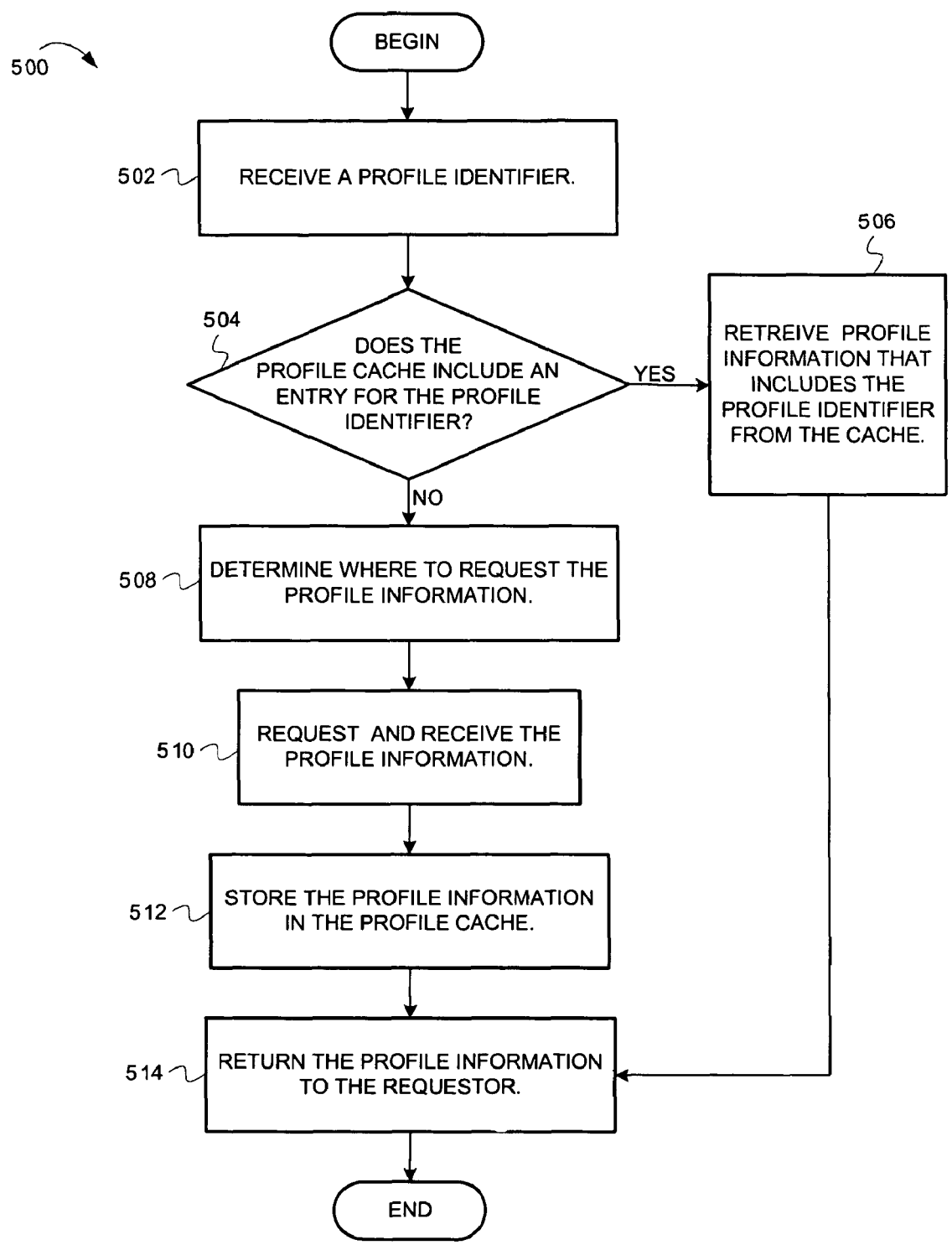
FIG. 5 is a flow diagram illustrating operations for returning lower-level information, according to exemplary embodiments of the invention.

FIG. 4 is a flow diagram illustrating operations for creating a subscriber connection, according to exemplary embodiments of the invention. The flow diagram 400 will be described with reference to the exemplary system shown in FIGS. 2 and 3. The flow 400 commences at block 402.

At block 402, a subscriber connection request is received. For example, the subscriber manager 302 receives a connection request from a PC 202. The connection request can be a point-to-point protocol (PPP) request or a user activation over a shared medium as in advanced subscriber management (ASM) system where subscribers are recognized using source information of the data packets. In one embodiment, the subscriber connection request includes subscriber authentication information (e.g., a subscriber identifier and a password), which can be used to authenticate the subscriber. The flow continues at block 404.

At block 404, a subscriber authorization request is transmitted. For example, the subscriber manager 302 transmits an authorization request to the Remote Authentication Dial-In User Service (RADIUS) server 224. In one embodiment, the authorization request is an asynchronous message that includes the subscriber authentication information. The flow continues at block 406.

At block 406, a host identifier and authorization response including one or more first-level profile identifiers are received. For example, the subscriber manager 302 receives an authorization response from the RADIUS server 202. The authorization response can include a message, a host identifier, and one or more first-level profile identifiers. The message indicates whether the subscriber was successfully authenticated. The first-level profile identifier defines a subscriber service or refers to one or more second-level profile identifiers (see discussion above) and the host identifier indicates where the profile identifiers are stored or indicates the service VR where the subscriber may receive service (e.g., the host identifier indicates which of the VRs 230 is storing second-level profile identifiers). The flow continues at block 408.

At block 408, a determination is made about whether the authorization was successful. For example, the subscriber manager 302 determines whether the authorization response included a message indicating that the authorization was successful. If the authorization was successful, the flow continues at block 410. Otherwise, the flow continues at block 414.

At block 414, the requestor is informed that the session could not be created. For example, the subscriber manager 302 transmits a message to the PC 202 informing the subscriber that a session could not be created. From block 414, the flow ends.

At block 410, if necessary, the second-level profile identifier is acquired. For example, the subscriber manager 302 requests and receives one or more second-level profile identifiers (associated with the first-level profile identifier) from a system component. In one embodiment, the subscriber manager 302 requests and receives the second-level profile identifiers from the profile manager 308. Alternatively, the subscriber manager 302 can request and receive the profile identifiers from another VR 228. According to embodiments, the second-level profile identifiers can be stored in any VR's profile manager, radius server, or other accessible repository. In one embodiment, the subscriber manager 302 does not need to acquire second-level profile identifiers because the first-level profile identifier(s) explicitly define subscriber services. The flow continues at block 412.

At block 412, a virtual interface is created and the requester is informed about the connection. For example, the subscriber manager 302 creates a virtual interface 304 and transmits a connection message to the PC 202. In one embodiment, the virtual interface 304 refers to a physical connection between the PC 202 and the router box 214. In one embodiment, the subscriber manager 302 configures the virtual interface 304 based on the profile identifiers. For example, based on the profile identifiers, the subscriber manager 302 configures inbound and outbound policies for the virtual interface 304. From block 414, the flow ends.

While FIG. 4 describes operations performed by an embodiment of a subscriber manager, FIG. 5 describes operations performed by an embodiment of a profile manager. FIG. 5 is a flow diagram illustrating operations for returning lower-level profile information, according to exemplary embodiments of the invention. The flow diagram 500 will be described with reference to the exemplary system of FIGS. 2 and 3. In one embodiment, the operations of the flow diagram 500 can be performed by any VR's profile manager. The flow 500 commences at block 502.

At block 502, a profile identifier is received. For example, the profile manager 308 receives a profile identifier (e.g., a first-level profile identifier) from the subscriber manager 302 or the policy engine 306. The flow continues at block 504.

At block 504, a determination is made about whether the profile cache includes an entry for the profile identifier. The entry can also include profile information. Profile information can include a set of attributes that define the content of a profile. Profile information may be available in the profile cache if the profile was previously obtained from a profile server. For example, the profile manager 308 determines whether its profile cache 310 includes an entry for the profile identifier. If the profile cache 310 does not include an entry for the profile identifier, the flow continues at block 508. Otherwise, the flow continues at block 506.

At block 506, the profile information is retrieved from the profile cache. For example, the profile manager 308 retrieves lower-level profile information (e.g., a second-level or third-level profile information) from the profile cache entry. The flow continues at block 514.

At block 508, a determination is made about where to request the profile information. For example, the profile manager 308 determines where it should request the profile identifiers. In one embodiment, the profile manager 308 refers to an ordered list of profile servers to determine where to request the profile information. For example, the ordered list can dictate that the profile manager 308 first request the lower-level profile information from the RADIUS server 224. If that request is not successful, the profile manager 308 would then request the lower-level profile information from other repositories enumerated in the list (e.g., other VRs 228, the control server 226, etc.) The flow continues at block 510.

At block 510, the profile information is requested and received. For example, the profile manager 308 requests and receives lower-level profile information from a system component (e.g., the RADIUS server 224). The flow continues at block 512.

At block 512, the profile information is stored in the profile cache. For example, the profile manager 308 stores the lower-level profile information in its profile cache 310. The flow continues at block 514.

At block 514, the profile information is returned to the requester. For example, the profile manager 308 returns the profile information to a system component (e.g., the policy engine 314). From block 514, the flow ends.

Figure 6:
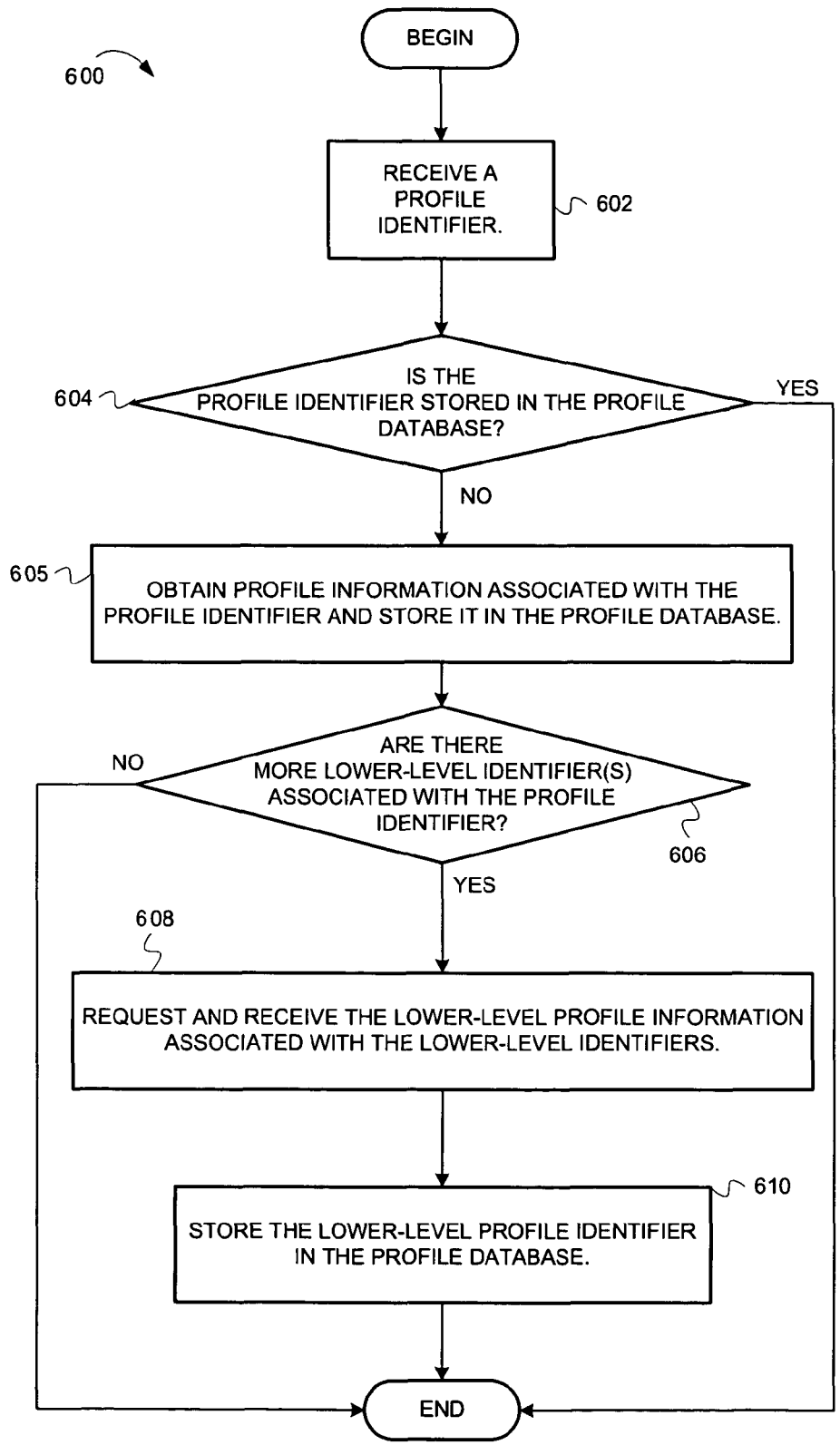
FIG. 6 is a flow diagram illustrating operations for storing lower-level profile identifiers, according to embodiments of the invention.

FIG. 6 is a flow diagram illustrating operations for storing lower-level profile identifiers, according to embodiments of the invention. In one embodiment, flow diagram 600 describes operations performed by the policy engine. The flow diagram 600 will be described with reference to the exemplary system of FIGS. 2 and 3. The flow diagram 600 commences at block 602.

At block 602, a profile identifier is received. For example, the policy engine 306 receives a profile identifier from the virtual interface 304 when a subscriber's inbound or outbound policy is set or changed. The flow continues at block 604.

At block 604, a determination is made about whether the profile information including the profile identifier is stored in the profile database. In one embodiment, the policy engine 306 searches its profile database 314 for the profile information using the profile identifier.

A brief example of searching for a lower-level profile identifier in the profile database 314 is described below, in conjunction with FIG. 7. FIG. 7 illustrates tables stored in the policy engine, according to exemplary embodiments of the invention. Tables 704 and 706 include hierarchical profile identifiers. In particular, table 704 includes fields associating first-level profile identifiers with second-level profile identifiers. For example, in table 704, first-level profile identifier S1 is associated with second-level profile identifiers F1, F2, and F3. Table 706 includes fields for associating second-level profile identifiers with third-level profile identifiers. For example, in table 706: 1) second-level profile identifier F1 is associated with third-level profile identifier A1; 2) second-level profile identifier F2 is associated with third-level profile identifiers A2 and A4; and 3) second-level profile identifier F3 is associated with third-level profile identifiers A1 and A3.

Based on the tables 704 and 706, the policy engine 306 can determine whether a particular profile identifier is associated with a lower-level profile identifier by dereferencing the profile identifiers. For example, using tables 704 and 706, the policy engine 306 can determine that first-level profile identifier S1 is associated with third-level profile identifiers A1, A1, A2, A3, and A4. In one embodiment, the third-level profile identifiers define services that can be performed during subscriber sessions. In one embodiment, the relationships represented in the tables 704 and 706 can be represented in a single table.

Referring back to FIG. 6, if the profile identifier is in the profile database 314, the flow ends. Otherwise, the flow continues at block 605.

At block 605, profile information associated with the profile identifier is obtained and stored in the profile database. For example, the policy engine 306 obtains, from the profile manager 308, the profile information associated with the profile identifier and stores the profile information in its profile database 314. In one embodiment, the profile information includes a field associated with the lower-level profile identifier. In one embodiment, the profile identifier is not associated with a lower-level profile identifier. As noted above, the profile identifier can explicitly define subscriber services. From block 605, the flow continues at block 606.

At block 606, a determination is made about whether there are one or more lower-level profile identifiers associated with the profile identifier. In one embodiment, the policy engine 306 determines whether there are lower-level profile identifiers associated with the profile identifier by examining the profile information associated with the profile identifier. In one embodiment, the policy engine 306 determines whether there are more lower-level profile identifiers associated with the profile identifier by examining lower-level profile information associated with previously obtained lower-level profile identifiers. In one embodiment, if there are not one or more lower-level profile identifiers associated with the profile identifier, the profile identifier explicitly defines one or more subscriber services. In one embodiment, if there are one or more lower-level profile identifiers, the profile identifier explicitly defines one or more subscriber services and each of the one or more lower-level profile identifiers defines one or more additional subscriber services. In one embodiment, the one or more lower level profile identifiers and the profile identifier together define a service one or more subscriber services. If there are more lower-level profile identifiers associated with the profile identifier, the flow continues at block 608. Otherwise, the flow ends.

At block 608, the lower-level profile information associated with the one or more profile identifiers is requested and received. For example, the policy engine 306 requests the lower-level profile information associated with the one or more profile identifiers from the profile manager 308. The flow continues at block 610.

At block 610, the lower-level profile information is stored in the profile database. For example, the policy engine 306 stores the lower-level profile information in its profile database 314. In one embodiment, the policy engine 306 stores additional information (e.g., a handle) for the lower-level profile in a field along with the profile identifier to provide quicker access to the lower level profile without requiring to search the profile database. From block 610, the flow continues at block 606.

FIGS. 4-7 describe operations for initializing virtual interfaces and establishing subscriber connections. However, FIG. 8 describes operations for forwarding packets during a subscriber connection.

Figure 8:
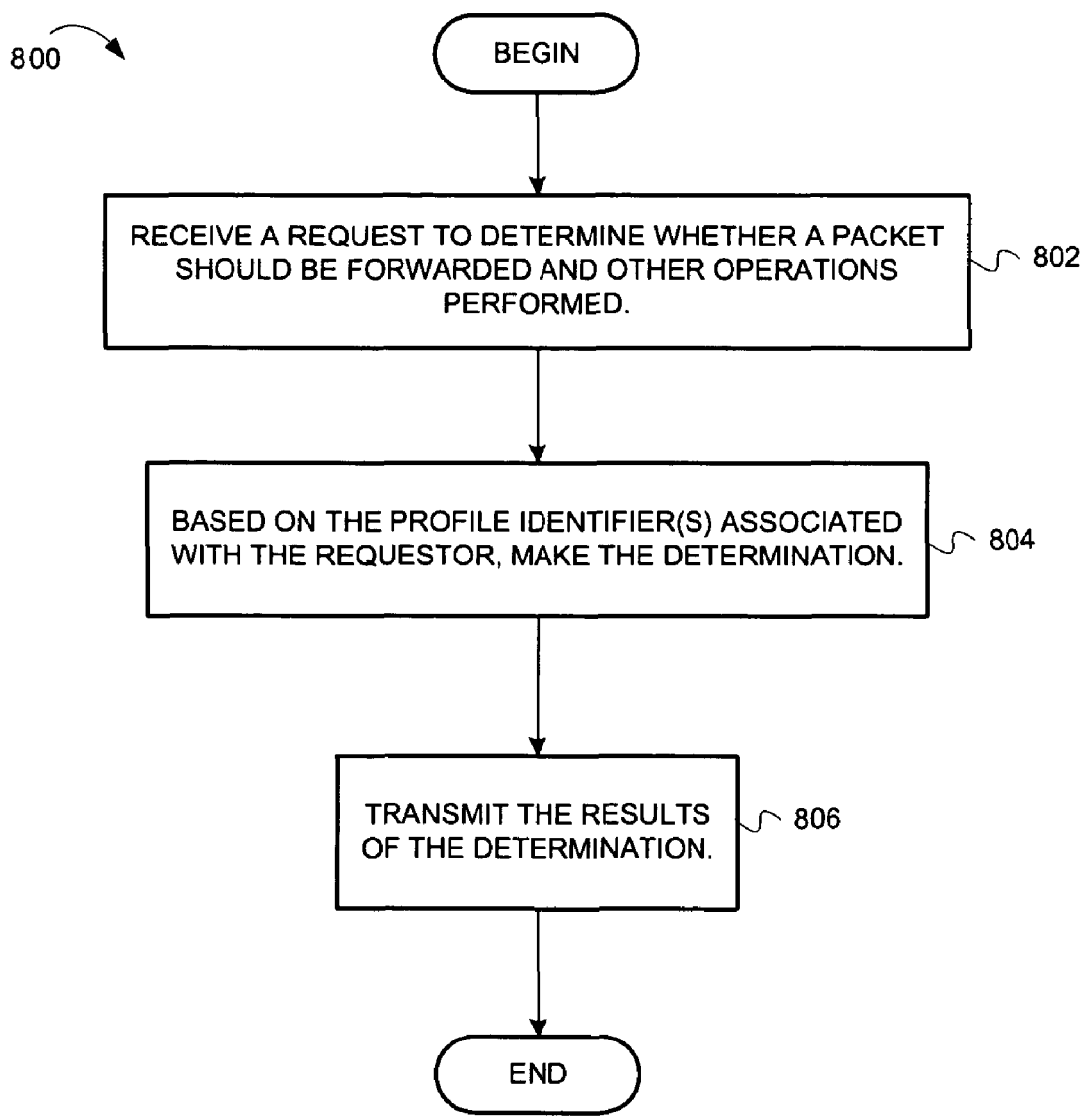
FIG. 8 is a flow diagram illustrating operations occurring in conjunction with packet forwarding during a subscriber connection, according to embodiments of the invention.

FIG. 8 is a flow diagram illustrating operations occurring in conjunction with packet forwarding during a subscriber connection, according to embodiments of the invention. The flow diagram 800 will be described with reference to the exemplary system of FIGS. 2 and 3. The flow diagram 800 commences at block 802.

At block 802, a request is received, where the request is to determine whether a packet should be forwarded and other operations performed. For example, the policy engine 306 receives a request from the virtual interface 304 to determine whether a packet should be forwarded and whether other operations should be performed on the packet (e.g., operations regarding a firewall, QoS, etc.). The flow continues at block 804.

At block 804, the determination about whether to forward/operate on packets is made based on one or more profile identifiers associated with the requestor. For example, the policy engine 306 determines whether the packet should be forwarded and whether other operations are to be performed based on one or more profile identifiers associated with the virtual interface 304. In one embodiment, the policy engine 306 looks in the virtual interface database 312 to determine a first-level identifier associated with the virtual interface 304. The policy engine 306 de-references the first-level profile identifier (using the profile database 314) to determine whether there are any lower-level profile identifiers associated with the virtual interface 304. After de-referencing the profile identifiers, the policy engine 306 can use the lower-level profile identifiers to determine whether the packet should be forwarded/operated upon. Because the lower-level profile identifiers define services (e.g., a firewall) to apply to the packet, the policy engine 304 can decide whether to forward the packet. The flow continues at block 806.

At block 806, the results of the determination are transmitted. For example, the policy engine 306 transmits the results to the virtual interface 304. In one embodiment, after the virtual interface 304 forwards and/or performs other operations on data packets based on the determination. From block 806, the flow ends.

According certain embodiments, the system 200 can alter existing services and/or add new services any time during the operation of the router box 214. As part of a process for modifying services, the system 200 can redefine associations between first-level profile identifiers and lower-level profile identifiers. The premium service package can initially include a 1 Mbps bandwidth service, where the premium service package is associated with a first-level profile identifier, and where the 1 Mbps bandwidth service is associated with a lower-level profile identifier. After the system 200 has been running for some time, the premium service package can be "upgraded" to include 5 Mbps bandwidth service instead of 1 Mbps bandwidth service. In order to make the upgrade available, a virtual router 228 can dissociate the premium service package's first-level profile identifier from the 1 Mbps lower-level identifier. It can then associate the premium service package's first-level profile identifier with a lower-level profile identifier that defines bandwidth service at 5 Mbps. As a result of modifying the profile identifiers, the virtual router 228 can modify services without requiring users to reestablish connections and without updating data for each subscriber in the system.

Figure 9:
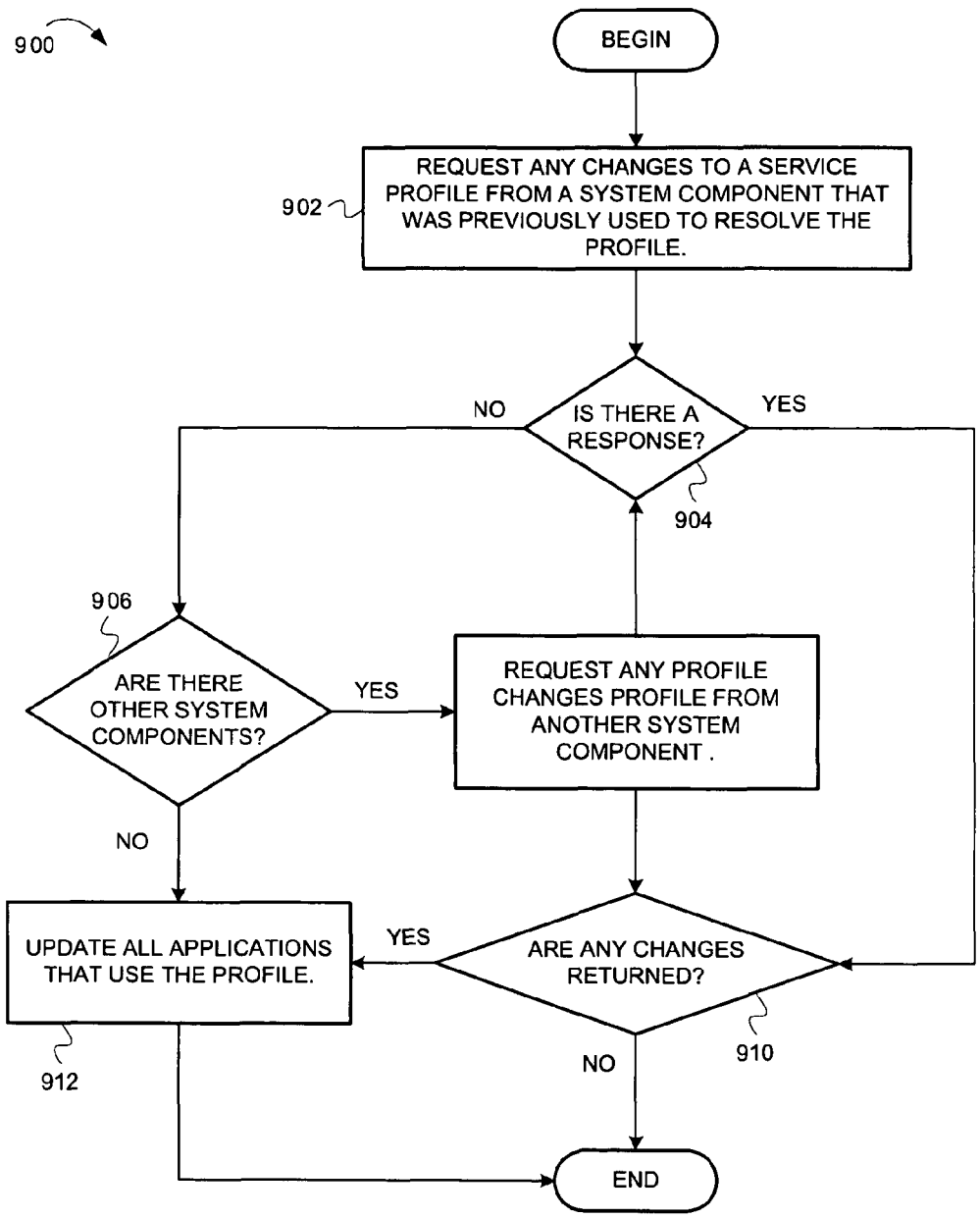
FIG. 9 is a flow diagram describing operations for modifying subscriber services, according to exemplary embodiments of the invention.

In one embodiment, the system performs the following operations for modifying services. FIG. 9 is a flow diagram describing operations for modifying subscriber services, according to exemplary embodiments of the invention. The flow diagram 900 will be described with reference to the exemplary system of FIGS. 2 and 3. The flow diagram 900 commences at block 902.

At block 902, service profile changes are requested from a system component that was previously used to resolve profiles. For example, the profile manager 308 requests new/modified profile identifiers from the RADIUS server 224 or other component of the system 200. In one embodiment, the profile manager 308 can request profile identifiers from any system component that it previously used to resolve subscriber profiles. The flow continues at block 904.

At block 904, a determination is made about whether there has been a response. For example, the profile manager 308 determines whether it has received a response from the system component (e.g., the control server 226). In one embodiment, the response can be an asynchronous response received anytime. If there has been a response, the process continues at block 910. Otherwise, the process continues at block 906.

At block 906, a determination is made about whether there are other system components from which modified profile information can be obtained. For example, the profile manager 308 can search a list of system components (e.g., an ordered list of VRs, Radius Servers or other profile servers) that could contain profile information. Based on the search, the profile manager 308 can determine which system components may contain modified profile information.

If there are system components other than those already queried that could include modified profile information, the flow continues at block 908. Otherwise, the flow continues at block 912.

At block 908, profile changes are requested from another system component. For example, the profile manager 308 requests profile changes from another system component, such as the RADIUS server 224. In one embodiment, the profile manager 308 determines the other system component by searching an ordered list of components. The flow continues at block 904.

At block 910, a determination is made about whether any profile changes were returned from the system components. If profile changes were returned from system components, the flow continues at block 912. Otherwise, the flow ends.

At block 912, all applications that use the profile are updated. For example, the profile manager 308 can transmit profile changes to any system component that is currently using the relevant profile. As a more specific example, profile manager 308 can transmit modified profile identifiers to the policy engine 306.

In one embodiment, system components that use the service profile are updated about the profile refresh failure (e.g., a profile refresh failure occurs when the flow arrives at block 912 by taking the "no" path from blocks 904 and 906). For example, the policy engine 306 is informed of a profile refresh failure. As a result, the policy engine 306 can remove from the profile database one or more lower-level profile identifiers associated with the service profile's first-level profile identifier. The profile manager 306 can be updated later, when new lower-level profile identifiers are available.

In another embodiment, system components that use the service profile are not updated about the profile refresh failure. In this case, the system components (e.g., the policy engine 306 continue to use previous profile identifiers. This enables the system 200 to operate normally during temporary network outages, when profile information may not be available. From block 912, the flow ends.

Although the flow 900 ends after block 912, in one embodiment, system components can wait some time period and begin executing flow 900 from block 902. In one embodiment, depending on the number profile refresh failures, the time period changes. In one embodiment, the system component can stop executing flow 900 after some number of profile refresh failures.

Thus, methods and apparatus for managing subscriber profiles are described herein. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method comprising:
defining each of a plurality of service contexts available to a plurality of subscribers of a broadband service provider in terms of one or more profile identifiers of a plurality of profile identifiers each of which is representative of a particular subscriber service supported by a broadband subscriber access environment provided by the broadband service provider;
maintaining, within a virtual router (VR) configured within a telecommunications system of the broadband service provider, a scalable subscriber profile database in which a memory requirement for the scalable subscriber profile database is dependent upon a number of available service contexts by hierarchically organizing the plurality of profile identifiers as intermediate profile identifiers and leaf profile identifiers, wherein the leaf profile identifiers explicitly define subscriber services that are available during a connection to the broadband service provider and the intermediate profile identifiers indirectly represent sets of one or more subscriber services, which are defined by way of the intermediate profile identifiers' associations with one or more lower-level identifiers including zero or more of the leaf profile identifiers and zero or more of the intermediate profile identifiers;
receiving, by a profile manager of the VR, an intermediate profile identifier of a subscriber of the plurality of subscribers;
determining, by the profile manager, whether a profile cache maintained by the profile manager includes an entry for the intermediate profile identifier; and
if the profile cache includes an entry for the intermediate profile identifier, retrieving, by the profile manager, profile information and one or more lower-level profile identifiers associated with the intermediate profile identifier from the entry; and
if the profile cache does not include the entry, performing the following, by the profile manager:
determining from where to request the one or more lower-level profile identifiers;
requesting the profile information and the one or more lower-level profile identifiers;
receiving the one or more lower-level profile identifiers;
creating a new entry in the profile cache for the intermediate profile identifier; and
storing the one or more lower-level profile identifiers in the new entry.

2. The method of claim 1, wherein two or more subscribers of the plurality of subscribers are associated with the intermediate profile identifier and wherein a total number of intermediate profile identifiers represented within the subscriber profile database is less than a total number of the plurality of subscribers.

3. The method of claim 1, wherein a lower-level profile identifier of the one or more lower-level profile identifiers is associated with a quality of service filter or a bandwidth filter.

4. The method of claim 1, wherein the one or more lower-level identifiers are requested from a system component.

5. The method of claim 4, further comprising:
requesting but not receiving an indication regarding whether a service profile has changed, wherein the service profile is associated with the intermediate profile identifier; and
updating an application that is using the intermediate profile identifier.

6. The method of claim 4, further comprising:
receiving an indication that a service profile has changed, wherein the indication is associated with the intermediate profile identifier; and
based on the indication, updating an application that is using the intermediate profile identifier.

7. The method of claim 6, further comprising:
requesting the indication from the system component; and
if the indication is not received, requesting the change indication from another system component.

8. The method of claim 7, further comprising:
after requesting the indication from the system component, waiting for a period of time; and
after the period of time has passed, requesting the indication from the other system component.

9. The method of claim 7, further comprising selecting the other system component from a plurality of system components of the VR, wherein the selection is based on an ordered list of the plurality of system components.

10. The method of claim 9, wherein the ordered list is associated with the intermediate profile identifier, and wherein other intermediate profile identifiers are associated with other ordered lists.

11. A non-transitory computer-readable storage medium embodying instructions, which when executed by one or more processors of a virtual router (VR) based telecommunications system of a broadband service provider perform a method comprising:
defining each of a plurality of service contexts available to a plurality of subscribers of the broadband service provider in terms of one or more profile identifiers of a plurality of profile identifiers each of which is representative of a particular subscriber service supported by a broadband subscriber access environment provided by the broadband service provider;
maintaining a scalable subscriber profile database in which a memory requirement for the scalable subscriber profile database is dependent upon a number of available service contexts by hierarchically organizing the plurality of profile identifiers as intermediate profile identifiers and leaf profile identifiers, wherein the leaf profile identifiers explicitly define subscriber services that are available during a connection to the broadband service provider and the intermediate profile identifiers indirectly represent sets of one or more subscriber services, which are defined by way of the intermediate profile identifiers' associations with one or more lower-level identifiers including zero or more of the leaf profile identifiers and zero or more of the intermediate profile identifiers;

receiving, by a profile manager of the VR, an intermediate profile identifier of a subscriber of the plurality of subscribers;

determining, by the profile manager, whether a profile cache maintained by the profile manager includes an entry for the intermediate profile identifier; and if the profile cache includes an entry for the intermediate profile identifier, retrieving, by the profile manager, profile information and one or more lower-level profile identifiers associated with the intermediate profile identifier from the entry; and if the profile cache does not include the entry, performing the following, by the profile manager:
determining from where to request the one or more lower-level profile identifiers;
requesting the profile information and the one or more lower-level profile identifiers;
receiving the one or more lower-level profile identifiers;
creating a new entry in the profile cache for the intermediate profile identifier; and
storing the one or more lower-level profile identifiers in the new entry.

12. The computer-readable storage medium of claim 11, wherein two or more subscribers of the plurality of subscribers are associated with the intermediate profile identifier and wherein a total number of intermediate profile identifiers represented within the subscriber profile database is less than a total number of the plurality of subscribers.

13. The computer-readable storage medium of claim 11, wherein a lower-level profile identifier of the one or more lower-level profile identifiers is associated with a quality of service filter or a bandwidth filter.

14. The computer-readable storage medium of claim 11, wherein the one or more lower-level identifiers are requested from a system component.

15. The computer-readable storage medium of claim 14, wherein the method further comprises:
requesting but not receiving an indication regarding whether a service profile has changed, wherein the service profile is associated with the intermediate profile identifier; and
updating an application that is using the intermediate profile identifier.

16. The computer-readable storage medium of claim 14, wherein the method further comprises:
receiving an indication that a service profile has changed, wherein the indication is associated with the intermediate profile identifier; and
based on the indication, updating an application that is using the intermediate profile identifier.

17. The computer-readable storage medium of claim 16, further comprising:
requesting the indication from the system component; and
if the indication is not received, requesting the change indication from another system component.

18. The computer-readable storage medium of claim 17, further comprising:
after requesting the indication from the system component, waiting for a period of time; and
after the period of time has passed, requesting the indication from the other system component.

19. The computer-readable storage medium of claim 17, further comprising selecting the other system component from a plurality of system components of the VR, wherein the selection is based on an ordered list of the plurality of system components.

20. The computer-readable storage medium of claim 17, wherein the ordered list is associated with the intermediate profile identifier, and wherein other intermediate profile identifiers are associated with other ordered lists.

* * * * *